Dec. 23, 1947.           C. C. GREEN                2,432,988
        CROWN CAP ASSEMBLING MACHINE WHICH ALIGNS
          GASKETS AND INDICATES ANY MISALIGNMENT
              Filed July 29, 1942          2 Sheets-Sheet 1

Dec. 23, 1947.                    C. C. GREEN                        2,432,988
                CROWN CAP ASSEMBLING MACHINE WHICH ALIGNS
                   GASKETS AND INDICATES ANY MISALIGNMENT
                        Filed July 29, 1942            2 Sheets-Sheet 2
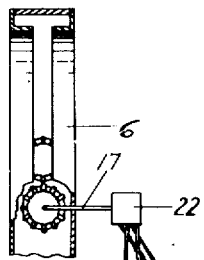
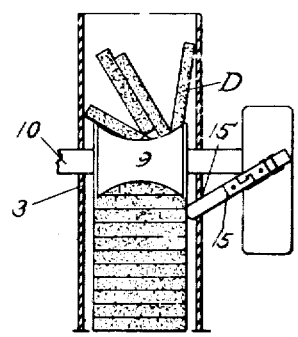
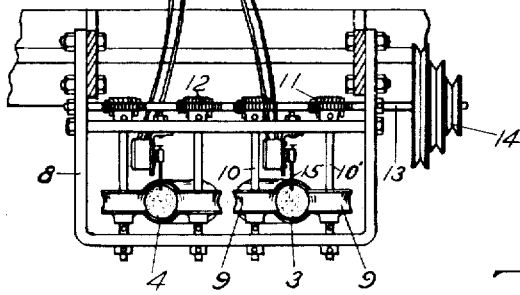
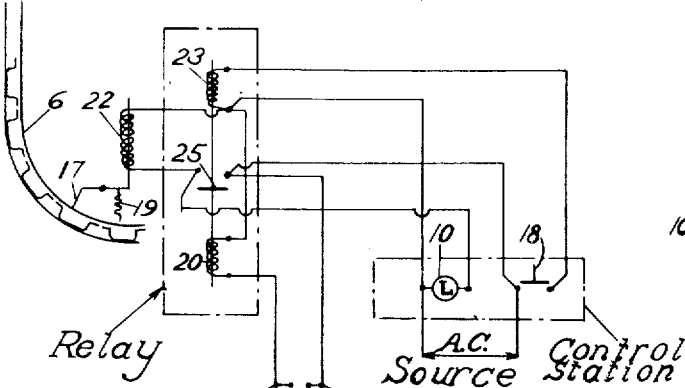
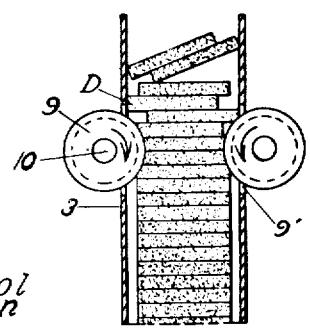
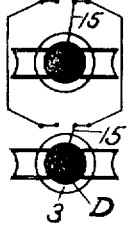

Patented Dec. 23, 1947

2,432,988

UNITED STATES PATENT OFFICE 2,432,988

CROWN CAP ASSEMBLING MACHINE WHICH ALIGNS GASKETS AND INDICATES ANY MISALIGNMENT

Clarence C. Green, Manheim Township, Lancaster County, Pa., assignor to Armstrong Cork Company, Lancaster, Pa., a corporation of Pennsylvania Application July 29, 1942, Serial No. 452,683

7 Claims. (Cl. 113—113)

This invention is concerned with closure assembling machines in which a closure shell such as a metal crown, for example, receives a sealing liner or disc, such as a wafer of cork, and is directed particularly to the problem of proper control of the machine when, for some reason, the sealing liners do not properly feed into and through the disc stacker.

My invention is particularly adapted for application to closure assembling machines of the type disclosed in Nagy Patents 1,931,294 and 2,069,897, granted October 17, 1933, and February 9, 1937, respectively. It will be understood reference to such patents is by way of illustration only and is not to be considered in any way as limiting the application of my invention to such types since similar and other types of assembling machines can use the mechanism to advantage. Nagy machines comprise an assembling unit where the shells and liners are adhesively secured together, the discs and shells being fed separately to such unit. Generally, the liner discs are placed in a hopper and pass therefrom down a stacking tube to a shuttle plate which feeds them to a star wheel which places them in the assembling unit in position to be pressed into the shells. The shells are also fed from a hopper through chutes to a star wheel which carries them to and places them in the assembling unit in axial alignment with the liners. While the shells are carried by the star wheel, adhesive is placed therein which serves to adhesively secure the liners in place when they are disposed in the shells by the plungers of the assembling unit.

I have found that frequently discs in the stacking tubes are not in alignment and jam or clog the tube, preventing free flow of the discs to the star wheel. This occurs particularly at the end of the stacking tube adjacent the hopper where the liners fall from the hopper into the tube in a more or less heterogeneous manner. In many cases, the discs are improperly disposed in the tube so that the shuttle plate, which feeds the discs to the star wheel, is unable to dispose discs in the pockets of the star wheel, thus interrupting flow of discs to the assembling drum. Shells carrying adhesive therein continue to be disposed in the assembling drum even though the flow of discs thereto has been interrupted. This is highly undesirable for such shells are subjected to the assembling operations even though no discs are present, the plungers which normally press the sealing liners in position in the shells being brought directly into engagement with the adhesive in the shells. Consequently, the adhesive is smeared over the ends of the assembling plungers. Thus, when subsequent shells and discs are assembled, adhesive is smeared onto the exterior surfaces of the discs, the discs adhere to the plungers and may have their exterior surfaces marred and weakened by removal from the plungers, while dirt and dust may adhere to the exterior surfaces by reason of the adhesive smeared on the discs, and upon application of the caps to containers, may fall into the contents of the containers. These disadvantages are caused by the failure of the disc feed due to misalignment of discs in the stacking tubes, failure of the supply of discs from the hopper due to mechanical deficiencies, and failure of the operator to maintain an adequate supply of liners in the hopper. The trouble may be easily corrected by the machine operator but generally she fails to notice the trouble until shells without discs appear on the inspection conveyor. This is too late to remedy the trouble since adhesive has already been smeared over the assembling plungers, necessitating that the machine be shut down and the assembling elements carefully cleaned. With other types of machines where dry, heat sensitive adhesives are used, the failure of the disc feed does not cause so much trouble but, nonetheless, it is desirable to insure that proper assembly may be always effected.

The chief object of my invention is to eliminate the trouble heretofore encountered in closure assembling machines due to failure of the disc feed; first, by securing better feed of the discs and, second, by an electrical control such as a signal to indicate to the operator that trouble has been encountered and, if desired, to effectively stop the machine or the feed of shells to the assembling unit, thus insuring that in no case will shells be fed to the assembling machine unless an adequate supply of lining discs is available for free feed to the assembling machine. Another object of my invention is to provide such a device which may be readily attached to the stacking tubes to make the invention immediately applicable to the assembling machines now in use.

This invention relates to a closure assembling machine which includes, in combination, a stacking tube through which discs are fed to assembling mechanism, means engageable with said discs as they pass through said tube, and electrical means controlled by the position of said means for initiating a control device.

This invention further relates to a tell-tale device for indicating improper feed of articles in a stacking tube comprising means projecting through an opening in the tube and engageable with the periphery of a disc positioned therein to assume one position, and to assume a second position when not in engagement with the periphery of a disc in said tube, and electrical means controlled by the position of said first mentioned means for initiating a control device.

The attached drawing illustrates a preferred embodiment of my invention in which Figure 1 is a diagrammatic view illustrating the device of my invention attached to a Nagy type closure assembling machine;

Figure 2 is a diagrammatic view, generally in plan, illustrating the device of this invention attached to a closure assembling machine in operating position;

Figures 3 and 4 are sectional views taken at right angles to each other through a conventional disc stacking tube and illustrating the disc aligning and electrical control means of this invention; and Figure 5 is a wiring diagram showing a typical electrical circuit for connecting the control means.

Figure 1:
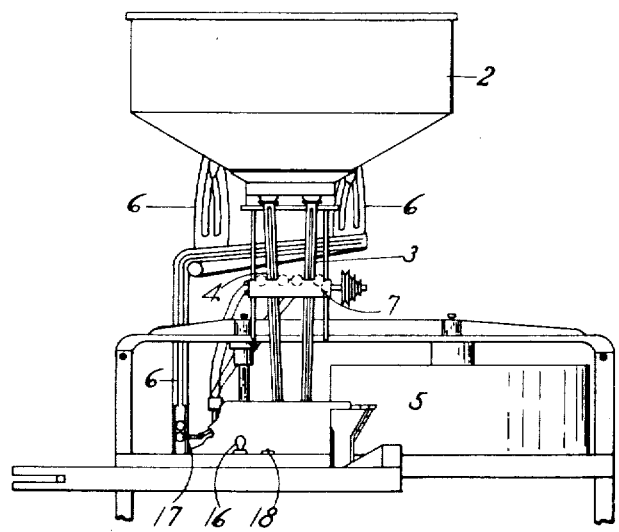

Referring to the drawing, there is illustrated diagrammatically a closure assembling machine having the device of my invention attached thereto. The assembling machine illustrated includes a hopper 2 for receiving the lining discs and a pair of stacking tubes 3 and 4 for feeding such lining discs by gravity to the usual shuttle plate and star wheel arrangement which disposes them in proper position in the assembling drum 5. The shuttle plate, star wheel, and assembling drum are conventional elements and are either not shown in the drawing or are shown only diagrammatically. A shell hopper which is disposed behind the disc hopper 2 feeds shells through chutes 6 to the usual star wheel which places the shells in the assembling drum 5 in position to receive discs from the stacking tubes 3 and 4.

As previously pointed out, the discs occasionally become misaligned in the tubes 3 and 4 without observation by the operator. Thus, shells are on occasion fed to the assembling drum without sealing liners disposed in them. To eliminate this difficulty insofar as possible, the aligning device of my invention has been provided. It is indicated generally at 7 in Figure 1 and is more specifically shown in Figures 2, 3, and 4. It includes a supporting framework 8 attached to the framework of the assembling machines adjacent the stacking tubes 3 and 4. A pair of aligning rolls 9 is provided for each stacking tube 3 and 4. These rolls 9 extend through openings 9' in the walls of the tubes and serve the purpose of aligning the discs D as they fall heterogeneously into the stacking tubes as is best illustrated in Figure 3. Preferably, the rolls are rotated in opposite directions as shown by the arrows in Figure 4 so as to engage the discs D and move them generally in the direction of feed of the discs through the tubes. The rolls incidentally exert a slight pressure on the stacked discs and assist in feeding them through the tubes to the shuttle plates. Rotation is imparted to the rolls 9 by shafts 10 which are mounted on and supported by the framework 8. Each shaft 10 is provided with a worm gear 11 which meshes with a worm 12 mounted on a common shaft 13 driven through a stepped pulley 14 adapted to be connected by a belt to the driving mechanism of the assembling machine proper. In order to impart the desired rotation to the rolls 9, each pair of worm wheels includes a righthand and a lefthand worm and gear so that the rolls 9 rotate in opposite directions as shown by the arrows in Figure 4. The rolls 9 are contoured so as to engage a relatively large portion of the periphery of the discs and as misaligned discs come into engagement with the aligning wheels 9, they are urged into engagement with the previously stacked discs and are caused to assume a generally horizontal position. The concavity of the rolls is such that the rolls serve to position the discs centrally of the stacking tubes as shown in Figures 3 and 4, thus permitting ample clearance between the discs and the tube to facilitate gravity feed and at the same time properly positioning the discs for operation of the electrical control which will now be described.

The electrical control device is effective in the event the discs for one reason or another are not properly aligned in the tube or in the event there be a failure of supply of discs to the tube. This control arrangement in the embodiment illustrated includes a switch 15 which extends through an opening 15' in the wall of each stacking tube 3 and 4 below the rolls 9, and has its leading edge adapted to engage the stack of aligned discs. The switch 15 is so disposed that properly aligned discs will force it downwardly from the generally horizontal position it would normally assume and the switch may be of such nature that when in such downward position electrical circuit is broken. If, however, the discs are not aligned or there is an absence of discs, the switch 15 will assume its normal position and the electrical circuit will be closed. As shown in Figure 3, the switch is weighted to assume a horizontal position. It may be spring urged, if desired.

As previously mentioned, the electrical control means is effective to prevent the feed of shells to the assembling unit when the feed of discs is impaired. This is accomplished by signaling the operator who dislodges the misaligned discs, shuts down the machine until proper feed of discs can be re-established, or recharges the hopper with discs. It can also be effected by automatic control of the feed of shells to the assembling unit, by automatically stopping the entire assembling machine, or otherwise.

A signaling device is illustrated in the preferred embodiment as comprising an incandescent lamp 16 shown in Figure 1 which is electrically connected through the switch 15 when failure of the disc feed occurs or is likely to occur through misaligned discs. A buzzer or other equivalent audible signal capable of performing the same function may be substituted since all that is necessary is that the operator's attention be drawn to the fact that misaligned discs are present one of the tubes or that improper feed of discs may have occurred.

In addition to the signal, it may be desirable to prevent the flow of shells to the assembling unit when there is any failure in the supply of liner discs until such time as the operator has corrected the trouble or at least has acknowledged that she is aware of the conditions which exist. For this purpose an electrical shell stop 17 (Figures 1, 2, and 5) is provided and adapted to be controlled by switch 15 simultaneously with signal 16. Within easy reach of the operator is a release or acknowledging button 18 movable by the operator to electrically release the stop 17. The control station, including the signal 16 and release button 18, preferably is mounted on the framework of the assembling machine in front of and within easy reach of the operator. The stop 17 is diagrammatically illustrated in Figure 5 as a pivoted trigger shown in disengaged position where it is normally held by spring 19. When the switch 15 assumes its normal weighted or spring urged position by reason of a failure in the supply of discs in the stacker tubes 3 or 4, the trigger actuated stop 17 is urged into the crown shell lying below it and all of the crowns disposed in the chute above the shell which is so engaged are held against forward movement while the shells which preceded it are free to move into the assembling unit. Since the stacker tubes contain a relatively sizable quantity of discs below the switch 15 at the time of any failure, there are always sufficient discs to take care of the few shells which are disposed beyond the stop 17.

A suitable electrical circuit for connecting the various members of the control unit is shown in Figure 5. The switches 15 are connected in parallel and serve to connect the relay coil 20 into circuit with the alternating current source when either of the switches is closed. When the relay coil 20 is energized, the switch 25 is urged upwardly closing the circuit for the signal 16 and a solenoid coil 22 which actuates the shell stop 17. When the operator is given the signal by illumination of the lamp 16 indicating some failure in the supply of liners, she may operate the acknowledging or control button 18 which completes the circuit for a relay coil 23 which opens the switch 25, deenergizing the solenoid coil 22 and releasing the shell stop 17, also opening the circuit for the signal 16 and extinguishing the light. The arrangement is such that the button 18 will be effective only in the event the switch 15 has been opened by a re-establishment of the supply of discs. However, the acknowledging button 18 may be effective to control a coil 23 which is designed to overcome coil 20 and if this be the case, then the acknowledging button 18 will be effective for re-establishing operation of the shell feed even though the switch 15 be closed; but this will necessitate that the switch 18 be held in closed position until such time as disc feed is re-established and switch 15 opened, whereupon relay coil 20 will be deenergized and switch 25 will be opened and solenoid coil 22 deenergized and stop 17 elevated into inoperative position by spring 19.

In the operation of my device, the discs will fall by gravity into the stacker tubes 3 and 4. They will be engaged by the rolls 9 and positioned centrally with respect to the stacker tubes and urged therethrough. Should, for one reason or another, there be a failure of supply of discs or discs be misaligned in tube 3 or 4, the switch 15 will close an electrical circuit giving the operator a visible or audible signal. Simultaneously, the feed of shells will be stopped until such time as the operator re-establishes the supply of properly aligned discs or at least until such time as she presses the acknowledging button indicating that she knows the condition to exist and can correct it. Upon re-establishment of the supply of discs, the switch 15 will be urged to its nonoperative position, the circuit for the switch which controls the signal and control will be rendered inoperative, and the device will continue to function in its normal manner.

From the foregoing description it will be understood that by my invention I have provided a device which will not only insure a better feed of the discs but also a device which will signal the operator in the event of any failure and will stop the supply of shells to the assembling unit until the operator has corrected the difficulty and re-established a proper supply of discs. As is evident from an examination of Figure 2, the device of my invention may be readily assembled as a unit to closure lining machines now commonly in use since, except for the stop 17 and its controlling solenoid 22, the unit is entirely self-contained. The device as a whole is automatic in operation and eliminates any possibility of operation of the assembling machine without a proper supply of discs for the shells fed to the assembling unit.

While I have described and illustrated a preferred embodiment of my invention, it will be understood that it is not limited thereto since it may be otherwise embodied or practiced within the scope of the claims.

I claim:

1. In closure assembling machines, the combination of a stacking tube through which discs are fed to assembling mechanism, a shell chute through which shells are fed to the assembling mechanism, rolls extending through the wall of said tube adapted to dispose discs in said tube in alignment and in predetermined relationship to the wall of the tube, means extending through the wall of the tube adapted to be yieldably urged from normal position by passing aligned discs and to return to normal position when misaligned discs pass, and means actuatable by movement of said urgeable means for stopping the forward movement of shells through the shell chute when misaligned discs have passed.

2. In closure assembling machines, the combination of stacking tubes through which discs are fed to assembling mechanism, a shell chute through which shells are fed to the assembling mechanism, a pair of oppositely rotatable rolls extending through the wall of each tube on opposite sides thereof, said rolls being adapted to align the discs in said tubes and to urge them forward in said tubes, switches extending through the walls of the tubes adapted to engage aligned discs, said switches being urged from normal position by advancing aligned discs and being adapted to return to normal position when misaligned discs pass, means automatically operable by movement of said switches for halting the flow of shells in said shell chute when misaligned discs have passed the switches, and means actuatable by the operator for releasing said shell-halting means to permit forward movement of shells in said shell chute.

3. In closure assembling machines, the combination of a stacking tube through which discs are fed to assembling mechanism, a shell chute through which shells are fed to the assembling mechanism, oppositely rotatable rolls extending through the wall of said tube adapted to align discs in said tube and to urge the aligned discs forward in said tube, a switch extending through the wall of the tube adapted to engage aligned discs, said switch being yieldably urged from normal position by advancing aligned discs and being adapted to return to normal condition when misaligned discs pass, means for stopping the forward movement of shells through the shell chute, and an electrical control circuit connecting said shell stopping means with said switch and responsive to movement of said switch to actuate said shell stopping means when misaligned discs pass the switch.

4. In closure assembling machines according to claim 3, means actuable by the operator for releasing the shell-stopping means.

5. A tell-tale device for indicating improper feed of one of two lines of articles adapted to be assembled with one another, a stacking tube, means for feeding one line through said stacking tube, a chute, means for feeding the other line through said chute, said device comprising a plurality of rolls extending through the wall of said stacking tube for disposing articles in that line in alignment, a switch adapted to engage said aligned articles, said switch being urged from normal position by passing aligned articles and being adapted to return to normal position when misaligned articles pass, means automatically operable when said switch is in normal position to indicate that misaligned articles have passed said switch, and a stop automatically operable when said switch is in normal position for halting forward movement of articles in said chute.

6. A tell-tale device for attachment to a closure assembling machine to indicate improper feed of one of two lines of articles to be assembled with one another, a stacking tube, means for feeding sealing discs through said stacking tube, a chute, means for feeding closure shells through said chute, said device comprising horizontally disposed rolls for placing discs in alignment with one another in said stacking tube, movable contact means adapted to engage aligned discs, means for indicating to the operator that misaligned discs have passed said rolls, means for stopping the forward movement of said shells in said chute when misaligned discs pass said disc engaging means, and an electrical control circuit connecting said shell stopping means and said indicating means through said movable contact means and responsive to movement of said movable contact means to actuate said shell-stopping means and said indicating means.

7. A tell-tale device for attachment to a closure assembling machine to indicate improper feed of one of two lines of articles to be assembled with one another, a stacking tube, means for feeding sealing discs through said stacking tube, a chute, means for feeding closure shells through said chute, said device comprising horizontally disposed rolls for placing discs in alignment with one another in said stacking tube, a movable switch adapted to engage aligned discs, means for indicating to the operators that misaligned discs have passed said rolls, a stop for halting movement of said shells in said chute when misaligned discs pass said switch, and an electrical control system connecting said stop and said indicating means with said switch and responsive to movement of said switch to actuate said indicating means.

CLARENCE C. GREEN.

REFERENCES CITED

The following references are of record in the file of this patent:

UNITED STATES PATENTS

| Number | Name | Date |
|---|---|---|
| 1,358,255 | Seufer | Nov. 9, 1920 |
| 665,092 | Henius | Jan. 1, 1901 |
| 2,351,888 | Stewart | June 20, 1944 |
| 2,108,163 | Clark | Feb. 15, 1938 |
| 1,668,922 | Podel | May 8, 1928 |
| 798,549 | Wheeler | Aug. 29, 1905 |
| 2,102,605 | Bach | Dec. 21, 1937 |
| 1,185,895 | Fast | June 6, 1916 |
| 1,574,914 | McNamara | Mar. 2, 1926 |
| 1,736,092 | Rivera | Nov. 19, 1929 |

---

Certificate of Correction

Patent No. 2,432,988.  December 23, 1947.

CLARENCE C. GREEN

It is hereby certified that error appears in the printed specification of the above numbered patent requiring correction as follows: Column 7, line 2, for the word "actuable" read *actuatable*; and that the said Letters Patent should be read with this correction therein that the same may conform to the record of the case in the Patent Office.

Signed and sealed this 9th day of March, A. D. 1948.

[SEAL]

THOMAS F. MURPHY,
*Assistant Commissioner of Patents.*

4. In closure assembling machines according to claim 3, means actuable by the operator for releasing the shell-stopping means.

5. A tell-tale device for indicating improper feed of one of two lines of articles adapted to be assembled with one another, a stacking tube, means for feeding one line through said stacking tube, a chute, means for feeding the other line through said chute, said device comprising a plurality of rolls extending through the wall of said stacking tube for disposing articles in that line in alignment, a switch adapted to engage said aligned articles, said switch being urged from normal position by passing aligned articles and being adapted to return to normal position when misaligned articles pass, means automatically operable when said switch is in normal position to indicate that misaligned articles have passed said switch, and a stop automatically operable when said switch is in normal position for halting forward movement of articles in said chute.

6. A tell-tale device for attachment to a closure assembling machine to indicate improper feed of one of two lines of articles to be assembled with one another, a stacking tube, means for feeding sealing discs through said stacking tube, a chute, means for feeding closure shells through said chute, said device comprising horizontally disposed rolls for placing discs in alignment with one another in said stacking tube, movable contact means adapted to engage aligned discs, means for indicating to the operator that misaligned discs have passed said rolls, means for stopping the forward movement of said shells in said chute when misaligned discs pass said disc engaging means, and an electrical control circuit connecting said shell stopping means and said indicating means through said movable contact means and responsive to movement of said movable contact means to actuate said shell-stopping means and said indicating means.

7. A tell-tale device for attachment to a closure assembling machine to indicate improper feed of one of two lines of articles to be assembled with one another, a stacking tube, means for feeding sealing discs through said stacking tube, a chute, means for feeding closure shells through said chute, said device comprising horizontally disposed rolls for placing discs in alignment with one another in said stacking tube, a movable switch adapted to engage aligned discs, means for indicating to the operators that misaligned discs have passed said rolls, a stop for halting movement of said shells in said chute when misaligned discs pass said switch, and an electrical control system connecting said stop and said indicating means with said switch and responsive to movement of said switch to actuate said indicating means.

CLARENCE C. GREEN.

REFERENCES CITED

The following references are of record in the file of this patent:

UNITED STATES PATENTS

| Number | Name | Date |
|---|---|---|
| 1,358,255 | Seufer | Nov. 9, 1920 |
| 665,092 | Henius | Jan. 1, 1901 |
| 2,351,888 | Stewart | June 20, 1944 |
| 2,108,163 | Clark | Feb. 15, 1938 |
| 1,668,922 | Podel | May 8, 1928 |
| 798,549 | Wheeler | Aug. 29, 1905 |
| 2,102,605 | Bach | Dec. 21, 1937 |
| 1,185,895 | Fast | June 6, 1916 |
| 1,574,914 | McNamara | Mar. 2, 1926 |
| 1,736,092 | Rivera | Nov. 19, 1929 |

---

Certificate of Correction

Patent No. 2,432,988.  December 23, 1947.

CLARENCE C. GREEN

It is hereby certified that error appears in the printed specification of the above numbered patent requiring correction as follows: Column 7, line 2, for the word "actuable" read *actuatable*; and that the said Letters Patent should be read with this correction therein that the same may conform to the record of the case in the Patent Office.

Signed and sealed this 9th day of March, A. D. 1948.

[SEAL]

THOMAS F. MURPHY,
*Assistant Commissioner of Patents.*